United States Patent [19]

Reymond et al.

[11] 4,314,761

[45] Feb. 9, 1982

[54] ARRANGEMENT FOR LOCATING RADIATING SOURCES

[75] Inventors: Jean C. Reymond; Jean L. Hidalgo; Claude Skenderoff, all of Paris, France

[73] Assignee: Thomson-CSF, Paris, France

[21] Appl. No.: 136,333

[22] Filed: Apr. 1, 1980

[30] Foreign Application Priority Data

Apr. 6, 1979 [FR] France ............................... 79 08786

[51] Int. Cl.[3] ......................... G01B 11/26; G02F 1/03

[52] U.S. Cl. .................................. 356/141; 244/3.16; 350/356; 356/152

[58] Field of Search .............. 356/141, 152; 244/3.16; 350/356

[56] References Cited

U.S. PATENT DOCUMENTS

| | | | |
|---|---|---|---|
| 3,951,550 | 4/1976 | Slick | 356/141 |
| 4,018,532 | 4/1977 | Fletcher et al. | 356/152 |
| 4,112,294 | 9/1978 | Pressiat | 356/152 |
| 4,193,688 | 3/1980 | Watkins | 244/3.16 |

FOREIGN PATENT DOCUMENTS

| | | | |
|---|---|---|---|
| 55-78267 | 12/1980 | Japan | 356/1 |
| 1520154 | 8/1978 | United Kingdom . | |

*Primary Examiner*—S. C. Buczinski
*Attorney, Agent, or Firm*—Cushman, Darby & Cushman

[57] ABSTRACT

A radiation sensor improved to increase the signal-to-noise ratio in the presence of a luminous background of high light intensity and to reduce the danger of direct detection of solar radiation. The sensor comprises optoelectric shutter means associated with the transparent slits of the optical mask in order to pass substantially only the radiation emitted by the source to be located and received by the associated detector. The shutter can be provided from a plate of ferroelectric ceramic material so arranged as to form juxtaposed elements controlled selectively by a circuit as a function of the positioning of the source in the form of data processed by an ancillary computer.

8 Claims, 10 Drawing Figures

FIG_1
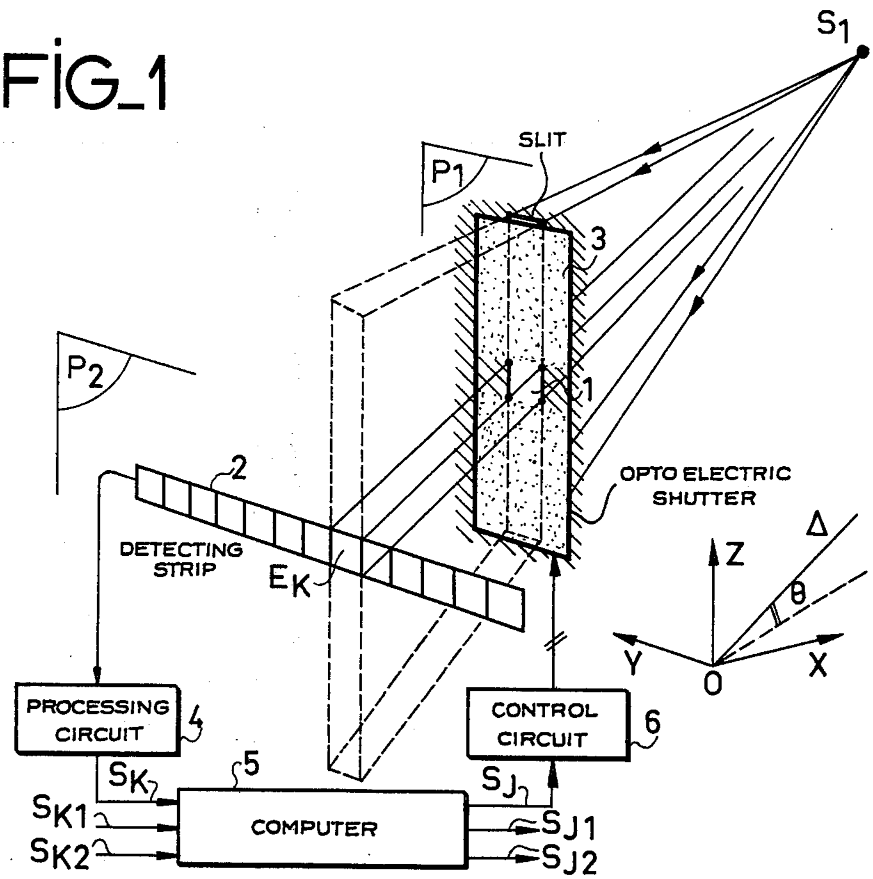
FIG_10
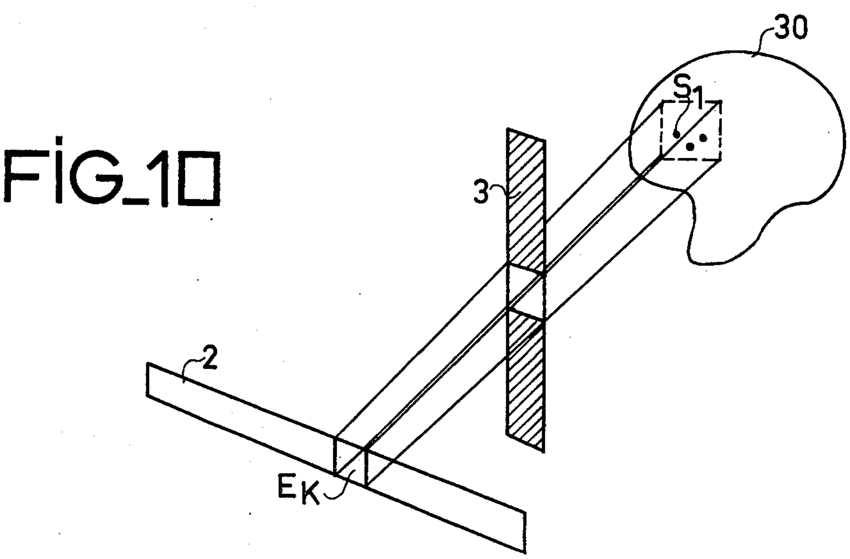

FIG_2
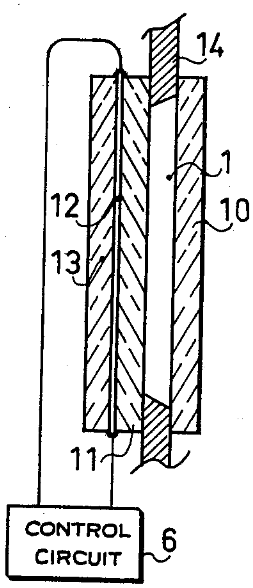
FIG_3
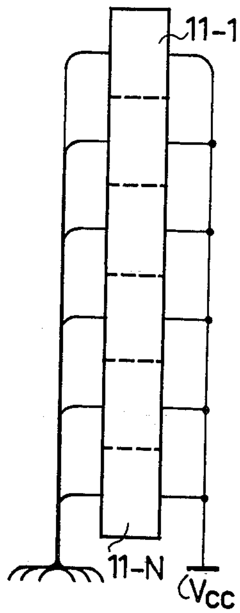
FIG_4
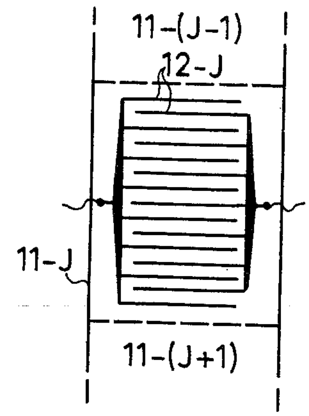
FIG_5
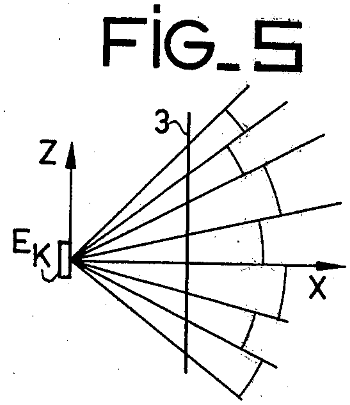
FIG_6
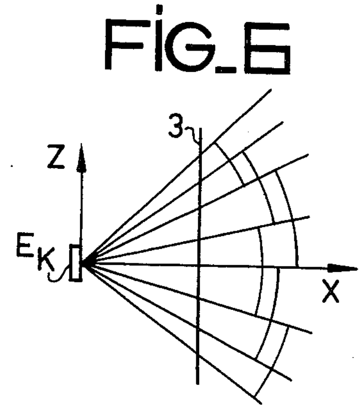
FIG_7
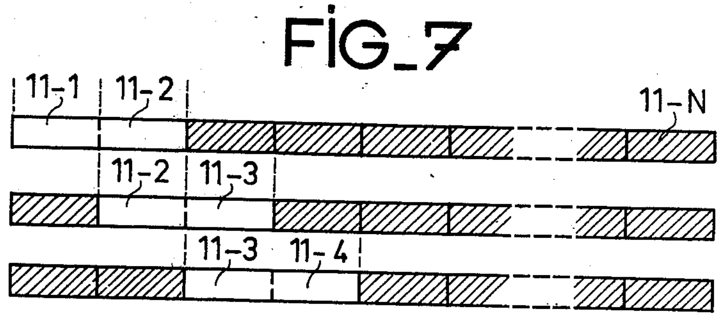

FIG_8
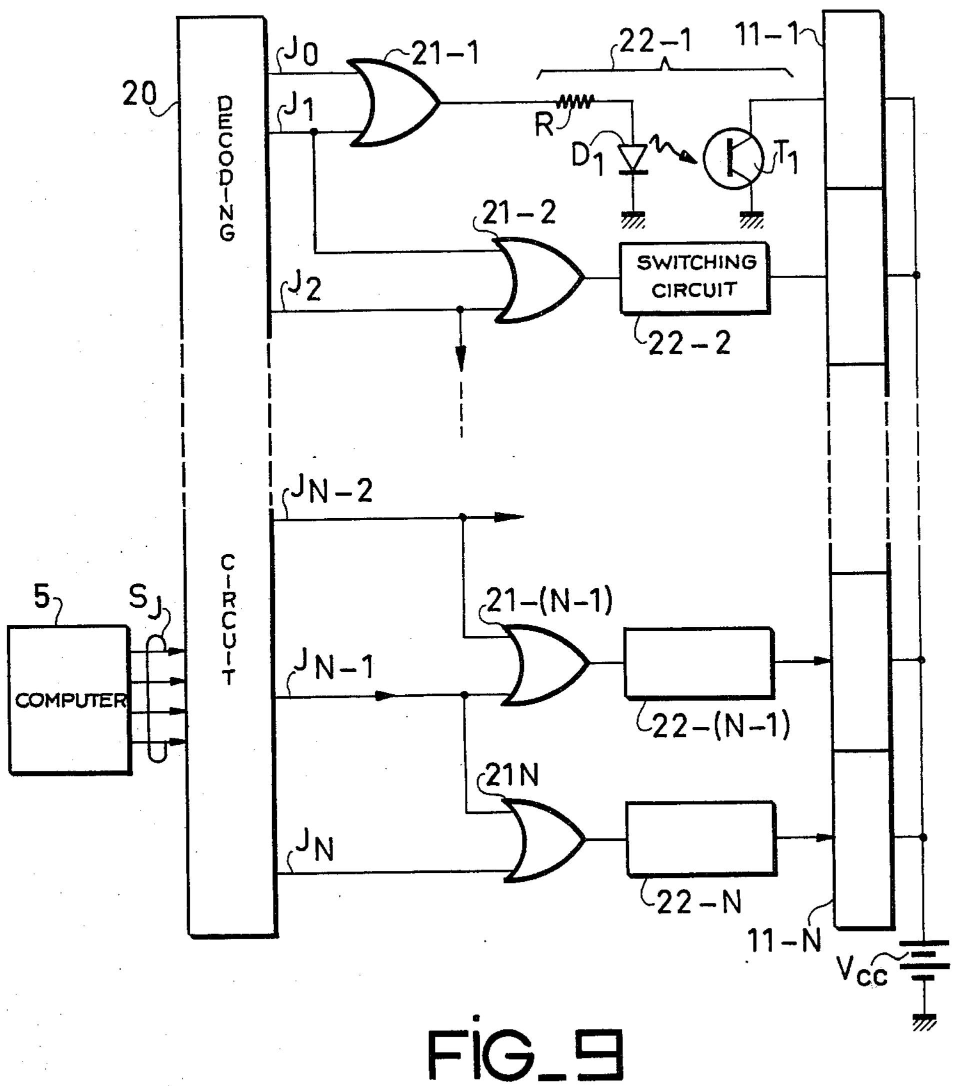
FIG_9
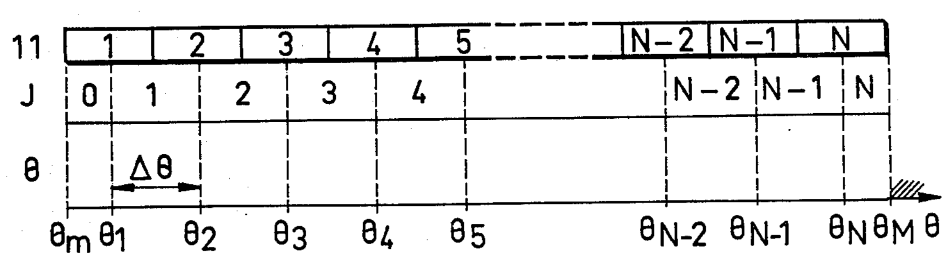

ARRANGEMENT FOR LOCATING RADIATING SOURCES

This invention relates to improvements in optoelectrical devices for locating a light source and determining the direction of a point source with respect to the device, or in other words, for determining the angular location of the source. Said improvements are applicable in particular to direction-finding systems such as helmet sight-visor systems.

In accordance with known techniques and as disclosed in U.S. Pat. No. 3,951,550, a device for determining the angular location of a point source of light comprises an optical mask at the front end of a housing, linear arrays of photosensitive elements being disposed in the bottom portion of said housing in a plane parallel to that of the mask. Said mask is provided with transparent zones in the form of linear slits in order to define the radiation from the source in at least two secant planes, the line of intersection of which passes through the radiation-emitting source. Each slit is associated with a strip radiation detector which is positioned at an angle with respect to the slit and preferably at right angles to said slit. Thus the points of intersection of the planes with the strip radiation detectors make it possible to determine by computation the angular location or direction of the source with respect to the device. Circuits for processing signals detected by the strip detectors serve to identify the positions of sensitized elements corresponding to the points of intersection and associated computing circuits process data relating to the angular displacement of the radiation source. When employed in conjunction with a number of point sources associated with a movable structure such as a pilot's helmet (the sources being supplied separately and sequentially), the device permits practically instantaneous computation of the spatial positions of sources and consecutive computation of the direction of an axis associated with the movable structure, namely the sighting direction in the application to a helmet sight-visor.

Suitable electronic processing makes it possible to remove or considerably reduce the noise effect produced by a luminous background if it is either uniform or slightly variable. On the other hand, it proves virtually impossible to remove the detected parasitic signal produced by the sun which directly illuminates a photosensitive receiver through a slit.

One aim of the invention is to provide a sensor for location of a radiating point source in which the above-mentioned disadvantage is overcome by employing an electrically controlled device having variable transparency for optically shutting-off the greater part of the slit and allowing only a small portion of the slit to remain transparent, that is to say substantially the useful portion of slit corresponding to radiation which is emitted by the source and reaches the associated strip radiation detector.

The improvements according to the invention thus permit an appreciable increase in the signal-to-noise ratio in the presence of a luminous background. As will become apparent hereinafter in the application of the invention to a helmet sight-visor, there is consequently a much lower probability of direct reception of solar radiation.

According to a distinctive feature of the invention, a sensor system for locating a point source of light comprises: an optical mask for allowing penetration of radiation from the source solely along transparent zones of predetermined shape and, in a plane parallel to the mask, an assembly constituted by linear arrays of photosensitive elements; circuits for processing the signals detected by said linear arrays and for identifying the positions of elements sensitized by the radiation transmitted through the mask; and ancillary means for computing the source location from photosensitive-element position identifications. Optoelectric cut-off means are provided for opacifying the transparent zones of the mask except for the regions which transmit the light radiation from the source to the arrays of detectors. Said cut-off means comprise a plurality of electrically controlled optical shutter elements and means for selecting elements corresponding to said regions, said selecting means being controlled by signals produced by the computing means aforesaid as a function of the angular source location.

These and other features of the invention will become more readily apparent to those skilled in the art upon consideration of the following description and accompanying drawings, wherein:

FIG. 1 is a simplified diagram of an improved source-locating arrangement according to the invention;

FIGS. 2 to 4 are diagrams relating to one example of embodiment of an optoelectric shutter device which is employed in accordance with the invention;

FIGS. 5 to 7 are diagrams relating to modes of operation of a shutter device in accordance with FIGS. 2 to 4;

FIGS. 8 and 9 show respectively a diagram of one example of embodiment of a control circuit for the shutter device according to FIGS. 2 to 4, and an operating diagram;

FIG. 10 is a diagram relating to one application of the invention to a helmet sight-visor system.

In the simplified diagram of FIG. 1, there is shown a single assembly consisting of a linear slit 1 and a detecting strip 2. It will be understood that the source-locating device or sensor is provided with a plurality of slits or assemblies in order to determine at least two secant planes which pass through the point source S1 to be located. In accordance with the invention, an electrically controlled variable-transparency device 3 is associated with each slit. The signals detected by the strip 2 consisting of a linear mosaic of photodetectors are transmitted to the processing circuit 4 for identifying the positions of the sensitized elements, in this case the position K of the element EK if it is assumed for the sake of simplification that a single element has been sensitized. The corresponding information SK as well as the information SK1, SK2 derived from other assemblies or slits are subsequently processed by computation in the circuit 5 in order to determine the angular or spatial location of the source in accordance with known techniques.

The slit and the detecting strip are located in planes P1, P2 which are parallel and perpendicular to the reference direction X; the strip is oriented in the direction Y and the slit is oriented in the perpendicular direction Z although this arrangement is not to be considered in any limiting sense.

The improvements to the radiation sensor in accordance with the present invention consist in providing each slit of the sensor with a variable-transparency device of the type designated as an optoelectric shutter 3, said shutter being controlled by a circuit 6 from data SJ produced by the ancillary computing means 5.

It can be demonstrated that the light energy E which arrives on a detecting element EK is given substantially by the expression $E=L(Sd.Sf)/D^2$ where L is the luminance of the background observed through the slit, Sd is the area of the element EK, Sf is the area of the slit, D is the distance between the detecting strip and the slit. It is thus apparent that the reduction of the parameter Sf caused by the optoelectric shutter assembly produces correlatively a substantial reduction of the background luminance. On the other hand, the useful radiation emitted by the source S1 to be detected and located is maintained while a small zone of the slit remains transparent; this zone corresponds substantially to that portion of the field which includes the radiation emitted by the source S1 and arriving on the strip 2 as shown in FIG. 1. If consideration is given to the horizontal plane XOY and if $\Delta$ represents the direction EK-S1 of the source computed by the circuit 5 from different signals SK, it is apparent that the zone to be maintained transparent is determined by this assembly by means of the value of the angle of elevation $\theta$ of the source. This angular value is calculated by the circuit 5 which produces corresponding control data SJ in respect of each shutter control circuit 6 included within the sensor.

One example of construction of the optoelectric shutter device will now be described with reference to FIGS. 2 to 4. The shutter is of the type which employs a ferroelectric ceramic plate fabricated as for example from the material usually designated as PLZT and consisting of lead lanthanum zirconate titanate. There are grouped together in said shutter a first polarizer 10, a PLZT ceramic plate 11, a circuit constituted by interdigitized electrodes 12 or so-called comb circuits, and a second polarizer 13. The complete assembly covers the zone of the slit 1 formed in a mechanical support 14. The PLZT plate is divided by duplication of the electrode circuits into a plurality N of shutter elements designated by the references 11-1 to 11-N and juxtaposed in the direction of the slit. Each element is connected to a direct-current potential Vcc via a first output and to the control circuit 6 via a second output. Selection by means of the circuit 6 is performed by applying the supply voltage to the element or elements concerned in order to make them transparent.

FIG. 4 shows one embodiment of an interdigitized electrode circuit 12-J which defines an elementary zone 11-J of the PLZT plate. The N zones of the ceramic plate PLZT can be maintained in the occulted state or made transparent separately. Subdivision into successive zones or elements makes it possible to simplify the construction of the control circuit.

Control of one element 11-J at a time corresponds to successive sectors which cover the field "seen" from the detecting strip as shown in the diagram of FIG. 5. In a preferred mode of utilization, two successive elements are controlled at the same time in order to obtain overlapping sectors (as shown in FIG. 6) and in order to prevent any ambiguity which may otherwise be caused in the previous case by transition from one sector to the next. FIG. 7 illustrates by way of example a control of transparent elements by successive pairs in time as a function of a corresponding movement of the light source.

FIG. 8 shows one example of construction of the control circuit 6 which follows the design concept of FIGS. 6 and 7 and includes a decoding circuit 20 for decoding the data SJ processed by the computer. By way of example, said data are four-wire outputs in respect of four-bit data, where N is equal to 16 at a maximum. The decoder has N+1 outputs J0 to JN connected to OR-circuits 21-1 to 21-N in which each circuit receives two successive outputs of the decoder. The outputs of these logical gates supply respectively a switching circuit 22-1 to 22-N. The first circuit 22-1 as shown in detail in FIG. 8 is constituted by a photocoupler assembly comprising a resistor R in series with a photoemitter diode D1 and a phototransistor T1 which performs the function of a switch on the supply circuit of the element 11-1 concerned. This assembly makes it possible to isolate the logic circuit from the direct-current high voltage Vcc for supplying the PLZT elements. Supply of an element 11-J by closing the corresponding switching circuit makes this element transparent.

The operation is illustrated in FIG. 9 in which the elements 1 to N of the shutter 11 and the values J and $\theta$ are shown in correspondence. The angle $\theta$ can vary between a minimum value $\theta_m$ and a maximum value $\theta_M$. When $\theta$ is comprised between $\theta_m$ and a first value $\theta_1$, the computer 5 processes a datum SJ corresponding to the decoded output J0 and the first element 11-1 is transparent. In the case of the following range of elevation $\theta_1$ to $\theta_2$, the computer delivers the datum SJ corresponding to $J_1$ and the two elements 11-1, 11-2 are made transparent, and so on. The outputs J1 to JN-1 correspond to two transparent elements and the end outputs J0 and JN correspond to a single transparent element ($\theta<\theta 1$ and $\theta>\theta_N$). The range of elevation $\Delta\theta$ corresponds to the range produced by an element 11-J by assimilating the angular distribution with a uniform distribution; this can be contemplated in the case of a fairly limited total range $\theta_m$ to $\theta_M$ which is smaller than 30°, for example, and in the case of a sufficiently large number N of shutter elements. The parameter $\Delta\theta$ can also be predetermined so as to be variable and to correspond each time in a precise manner to the corresponding angular range from the mid-point of an element 11-J to the mid-point of the following element 11-(J+1).

For acquisition of the source at the initial instant of operation, the shutter device 3 is made totally transparent in order to derive benefit from the total field of the sensor resulting from each assembly of a detecting strip 2 with the associated slit 1. This can be obtained by initial coding of the outputs SJ such that the outputs J1 to JN-1 are equal to 1, thus initiating the supply of all of the PLZT elements 11-1 to 11-N. As soon as the source has been located by computation, the data SJ represent the value $\theta$ and the system carries out an automatic sequential-control operation.

The optoelectric shutter devices 3 can be constructed in another manner by employing only PLZT ceramic elements, for example by means of liquid crystals.

The signals SK1, SK2 at the input of the computing circuit 5 of FIG. 1 represent position information derived from other strip and slit assemblies forming part of the sensor which comprises at least two assemblies. The signals SJ1 and SJ2 represent the control signals of the shutter devices corresponding to the other assemblies.

It will be clearly understood that the improvements described are not limited to the type of sensor considered in which a linear slit is associated with a detecting strip having a perpendicular direction. These improvements can be transposed and applied to other types of sensors having slits of different shape such as, for example, sensors provided with a plurality of slits associated with one strip.

The source-locating arrangement according to the invention offers a number of advantages. The signal employed is not impaired since the portion which is optically advantageous for illumination of the detector is the field defined by the transparent portion of the optical mask and the source; this field terminates substantially in the zone EK of the receiver. In the presence of an intense luminous background, the parasitic signal caused by the background is appreciably reduced in the ratio of the areas of the slit and of the selected transparent portion; in the case of a shutter having N elements, the gain can attain N. The solid angle in which parasitic point sources or quasi-point sources can be located is reduced approximately in the same ratio. Furthermore, since the source S1 (or the group of sources) can be supported by a material structure 30 such as a pilot's helmet as shown by way of example in FIG. 10, this structure can occult a large portion of the external field through which the solar radiation can pass to the photosensitive receiver; in particular, the structure 30 occults the entire external field which terminates in the element (or the zone of elements) EK in the example shown in the figure. Thus the probability of direct detection of solar radiation is highly attenuated.

In fact, the obturator device introduces an optical attenuation in the transparent state but this is not objectionable in the case of detectors in CCD circuits which have very high sensitivity, and produces action both on the useful signal and on parasitic signals, taking this attenuation into account.

What is claimed is:

1. A sensor system for location of radiation sources comprising:

an optical mask for allowing penetration of radiation from the source solely along transparent zones of predetermined shape;

detection means constituted by linear detecting arrays of photo-sensitive elements disposed in a detection plane parallel to the mask for detection of the said source radiation transmitted through the said transparent zones;

circuits for processing the signals detected by said linear arrays and producing control signals identifying the positions of elements sensitized by the radiation transmitted through the mask;

ancillary computing means for computing the source location from the said position identifications;

optoelectrical shutter means for dividing each of the transparent zones into juxtaposed regions and for opacifying said zones except the regions which substantially transmit light from the said radiation source to the said detection plane solely onto photosensitive elements of the said linear arrays, said optoelectrical shutter means comprising electrically controlled optical shutter elements which correspond to said regions respectively and selection means for selecting shutter elements corresponding to the said transmitting regions by means of said control signals produced by the said computing means.

2. A sensor system according to claim 1, wheren each transparent zone is fitted with an arrangment of optoelectric shutter elements juxtaposed in the direction of the said transparent zone substantially in order to permit occultation of any region of said zone.

3. A sensor system according to claim 2, wherein the optoelectric shutter means are of the type which consists of a plate of ferroelectric ceramic material.

4. A sensor system according to claim 3, wherein a plurality of N shutter elements is obtained by duplication of interdigitized electrode circuits on a ceramic plate which is placed between two polarizers and covers the area of an associated transparent zone so that one or any number of the N corresponding elements of the shutter device thus formed may be made transparent by selective control of supply of the electrodes from an associated control circuit.

5. A sensor system according to claim 4 in which the transparent zones are constituted by slits associated respectively with a photodetecting strip, wherein each slit is equipped with a shutter arrangements comprising N juxtaposed regions and electrically controlled by the associated control circuit from signals which are representative of the angular positioning of the source and are produced by the ancillary computer.

6. A sensor system according to claim 4, wherein the associated control circuit controls both the supply of two interdigitized electrode circuits corresponding to two successive elements of the shutter.

7. A sensor system according to claim 5 or claim 6, wherein the control circuit comprises a circuit which serves to decode source-locating signals and is connected via outputs to a network of logical gate circuits followed by switching circuits associated respectively with the shutter elements, each interdigitized electrode circuit being connected to a switching circuit and to a direct-current supply.

8. A sensor system according to claim 7, wherein each switching circuit comprises a phototransistor optically coupled to a photoemitting diode supplied from the output of a gate circuit.

* * * * *